(12) United States Patent
Maguire et al.

(10) Patent No.: US 6,347,522 B1
(45) Date of Patent: Feb. 19, 2002

(54) COOLING SYSTEM FOR HTS MACHINES

(75) Inventors: James F. Maguire, Andover; Peter M. Winn, Framingham; Ahmed Sidi-Yekhlef, Westborough; Jie Yuan, Shrewsbury, all of MA (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 09/480,396

(22) Filed: Jan. 11, 2000

(51) Int. Cl.$^7$ .................................................. F25B 9/00
(52) U.S. Cl. ............................................................. 62/6
(58) Field of Search .................................................. 62/6

(56) References Cited

U.S. PATENT DOCUMENTS

| | | | |
|---|---|---|---|
| 3,473,341 A | | 10/1969 | Mulder |
| 4,164,126 A | | 8/1979 | Laskaris et al. |
| 4,223,239 A | | 9/1980 | Eckels |
| 4,396,847 A | | 8/1983 | Weghaupt et al. |
| 4,808,864 A | | 2/1989 | Brunet et al. |
| 5,010,737 A | | 4/1991 | Okumura et al. |
| 5,094,083 A | * | 3/1992 | Horn et al. ....................... 62/6 |
| 5,385,010 A | | 1/1995 | Horn |
| 5,513,498 A | | 5/1996 | Ackermann et al. |
| 5,749,243 A | | 5/1998 | Lester |
| 5,848,532 A | * | 12/1998 | Gamble et al. ............... 62/48.2 |

FOREIGN PATENT DOCUMENTS

| | | |
|---|---|---|
| EP | 1026755 A1 | 8/2000 |
| WO | WO99/62127 | 12/1999 |

OTHER PUBLICATIONS

Patent Abstracts of Japan, Publication No. 57162945, Publication Date: Jun. 10, 1992, application No. 56049565, Title: "Rotor for Superconductive Rotary Electric Machine".

* cited by examiner

*Primary Examiner*—Henry Bennett
*Assistant Examiner*—Malik N. Drake
(74) *Attorney, Agent, or Firm*—Fish & Richardson P.C.

(57) ABSTRACT

A cryogenic cooling system is configured to control the flow of a heat transfer fluid through a remote thermal load, such as a superconducting magnet or rotor. The cryogenic cooling system includes a refrigerator including a cryogenically cooled surface and a cryogenic fluid transport device disposed within the refrigerator for circulating a heat transfer fluid between the cryogenically cooled surface and the remote thermal load. The cryogenic fluid transport device being positioned within the refrigerator advantageously serves as device for providing the necessary mechanical force necessary to move the heat transfer fluid from the cryogenically cooled surface (e.g., end of a cryocooler) to the remote thermal load. Thus, unlike conventional cooling arrangements the heat transfer fluid does not require a phase change.

21 Claims, 1 Drawing Sheet

US 6,347,522 B1

COOLING SYSTEM FOR HTS MACHINES

TECHNICAL FIELD

This invention relates to cooling loads, particularly superconducting loads in rotating reference frames.

BACKGROUND

The invention relates to cooling loads including superconducting components (e.g., a superconducting magnet).

Superconducting rotating machines such as motors and generators must be cooled such that the field structures of their rotors are in the superconducting state. The conventional approach to cooling rotor field coils is to immerse the rotor in a cryogenic liquid. For example, a rotor employing field coils made of high temperature superconducting materials might be immersed in liquid nitrogen. In this case, heat generated by or conducted into the rotor is absorbed by the cryogenic liquid which undergoes a phase change to the gaseous state. Consequently, the cryogenic liquid must be replenished on a continuing basis.

Another approach for cooling superconducting magnets is the cryogenic refrigerator or cryocooler. Cryocoolers are mechanical devices operating in one of several thermodynamic cycles such as the Gifford-McMahon cycle and the Stirling cycle. Cryocoolers have found application, for example, in cooling the stationary magnets in magnetic resonance imaging systems. Good cryocooler performance depends in large part on a design optimized for the actual conditions within which the cryocooler operates. More recently cryocoolers have been adapted for operation in rotating environments, such as superconducting motors and generators. One approach for doing so is described in U.S. Pat. No. 5,482,919, entitled "Superconducting Rotor," issued to Joshi, assigned to the assignee of the present invention, and incorporated herein by reference. An approach for cooling field windings in a superconducting motor is described in U.S. Pat. No. 5,848,532, entitled "Cooling System for Superconducting Magnet," issued to Gamble et al., assigned to the assignee of the present invention, and incorporated herein by reference.

SUMMARY

The invention features a cryogenic cooling system configured to control the flow of a heat transfer fluid through a remote thermal load, such as a superconducting magnet or rotor.

In a general aspect of the invention, the cryogenic cooling system includes a refrigerator including a cryogenically cooled surface and a cryogenic fluid transport device disposed within the refrigerator for circulating a heat transfer fluid between the cryogenically cooled surface and the remote thermal load.

The cryogenic fluid transport device being positioned within the refrigerator advantageously serves as device for providing the necessary mechanical force necessary to move the heat transfer fluid from the cryogenically cooled surface (e.g., end of a cryocooler) to the remote thermal load. Thus, unlike conventional cooling arrangements the heat transfer fluid does not require a phase change.

Embodiments of this aspect of the invention may include one or more of the flowing features.

The refrigerator is stationary and the remote thermal load rotates relative to the stationary refrigerator. Thus, the system is well suited for use in applications (e.g., rotating machinery, such as motors and generators) where it is difficult to place the heat exchanging cooling device (e.g., cryocooler) in the rotating reference frame where the cooling is needed. The cryocooler can be a Gifford-McMahon cryocooler.

In another aspect of the invention, a method of cooling a rotating thermal load from a refrigerator having a cryogenically cooled surface includes the following steps. A fluid transport device is positioned within the refrigerator. The fluid transport device is operated to provide a heat transfer fluid to the thermal load in an initial non-rotating condition. The thermal load is rotated to a sufficient rotational velocity to generate sufficient forces to cause the heat transfer fluid to move toward the rotating thermal load.

With this approach, operation of the fan can be limited to the initial start up of the rotating thermal load, (e.g., rotor assembly) in a particular mode to increase the reliability of the fan and overall reliability of the system. This approach takes advantage of the difference in density of the cooled heat transfer gas supplied by the refrigerator and the warmer heat transfer gas heated by the rotating thermal load (e.g., superconducting windings) for return to the refrigerator. Specifically, the cold helium being supplied to the rotating thermal load is denser than the warmed gas being returned to the refrigerator. The centrifugal force supplied by the rotating thermal load "pushes" the helium radially away from the axis of rotating thermal load. However, because the density of the helium being returned is lower than the helium being supplied, the lower density helium is "pushed" toward the axis, thereby setting up a recirculation loop without additional force from the fan.

In embodiments relating to this method, operation of the fan may be terminated after the rotating thermal load has achieved a sufficient rotational velocity.

In certain embodiments of both aspects of the invention, a number of cryocoolers each having a corresponding cryogenically cooled surface may be used to provide a level of redundancy, thereby allowing continued operation of the system in the event that one or more of the cryocoolers requires repair or maintenance. In such embodiments, valving (and appropriate bypass conduits) may be provided to selectively isolate at least one of the plurality of the cryocoolers from remaining ones of the plurality of cryocoolers.

For similar reasons, a number of cryogenic fluid transport devices may be provided to provide the same maintenance and repair advantages described above with respect to the multiple cryocoolers.

Exemplary heat transfer fluids include helium, hydrogen, oxygen, nitrogen, argon, neon, and mixtures thereof.

Cooling system 10 also includes, in this embodiment, a pair of high-speed (10,000–30,000 rpm) fans 21 disposed within the refrigerator 12 for circulating the helium through the cooling system. In essence, fans 21 serve as a mechanical means positioned within the cryogenic environment for providing the necessary force to move the helium past cryocoolers 13 and on to rotor assembly 14. With that in mind, other mechanical devices capable of supplying such forces and operating in a cryogenic environment including diaphragms, piston-operated devices or blowers can serve as fluid transfer device(s) in cooling system 10. Thus, unlike many conventional cooling arrangements the helium (or other cryogenic fluid) need not undergo a phase change to be re-cooled after being heated by the load. As was the case with the multiple cryocoolers 13, a pair of fans 21 is used to provide redundancy and facilitate maintenance in the event that one of the fans requires maintenance or replacement. Of course, appropriate valve and bypass conduits are required Referring to FIG. 1, a cooling system 10 includes a heat exchanger in the form of a refrigerator 12 connected to a load, here a rotor assembly 14 of a superconducting motor 17, via a conduit circuit 15 through which a refrigerant, cryogenic or heat transfer fluid flows. The conduit circuit is formed of vacuum insulated lines. Because the cryogenic fluid is being delivered to a rotor assembly, a rotary seal, such as ferrofluidic seal 19 is used to interface refrigerator 12, which is in a stationary reference plane to rotor assembly 14 in a rotating reference plane. In this embodiment, the cryogenic fluid is helium and, therefore, cooling system 10 includes a source 20 of helium, which may be required to replenish helium to the system due to leakage, for example through rotary seal 19. Preferentially, the cryogen circulates through the cooling system in a gaseous state. Refrigerator 12 may be in the form of any of a wide variety of configurations including perforated plate or coiled tube heat exchangers. In this embodiment, refrigerator 12 is directly attached (e.g., by solder) to six cryocoolers 13, each of which may be any of a wide variety of cryocooling refrigerators designed to operate according to one of several thermodynamic cycles including Gifford-McMahon, Stirling and pulse-tube cycle, such as those described in U.S. Pat. No. 5,482,919, which is incorporated herein by reference. Each cryocooler 13 is associated with a compressor 23, however, in other embodiments, a single compressor may be used with the multiple cryocoolers. Each cryocooler provides a cryogenically cooled surface for cooling the helium. One example of a cryocooler appropriate for use in cooling system 10 is Model No. RGS 120-T, manufactured by Leybold, Inc., Cologne, Germany.

Cryocoolers 13 are connected in a series arrangement and include valves 18 to allow each cryocooler to be isolated from remaining ones of the cryocoolers while allowing continued operation of the system. In particular, bypass conduits (not shown) for each cryocooler 13 are used to allow continued flow of the cryogenic fluid so that the isolated cryocooler can be, for example, repaired or replaced. Valves 18 may be any of a wide variety of valves capable of operating at cryogenic temperatures including control or solenoidal valves. Valcor Scientific, Inc., Springfield, N.J. provides valves (e.g., on/off type) which are appropriate for use as valve 18 in cooling system 10.

Cooling system 10 also includes, in this embodiment, a pair of high-speed (10,000–30,000 rpm) fans 21 disposed within the refrigerator 12 for circulating the helium through the cooling system. In essence, fans 21 serve as a mechanical means positioned within the cryogenic environment for providing the necessary force to move the helium past cryocoolers 13 and on to rotor assembly 14. With that in mind, other mechanical devices capable of supplying such forces and operating in a cryogenic environment including diaphragms, piston-operated devices or blowers can serve as fluid transfer device(s) in cooling system 10. Thus, unlike many conventional cooling arrangements the helium (or other cryogenic fluid) need not undergo a phase change to be re-cooled after being heated by the load. As was the case with the multiple cryocoolers 13, a pair of fans 21 is used to provide redundancy and facilitate maintenance in the event that one of the fans requires maintenance or replacement. Of course, appropriate valve and bypass conduits are required to allow each of fans 21 to be isolated from the other while allowing continuous operation of the system. A fan determined well-suited for operation in a cryogenic environment is a Model A20 fan, available from Stirling Cryogenics and Refrigeration BV, The Netherlands.

Operation of fan 21 can be limited to initial start up of rotor assembly 14 in a particular mode to increase the reliability of the fan and overall reliability of the system. In particular, rotor assembly is configured such that the helium gas is introduced through a first introduction line 27 lying substantially along an axis 25 of the rotor assembly. The cooled helium from refrigerator 12 is then provided to the superconducting field windings along a supply line 29 that extends radially away from axis 25. The helium gas is then returned along a first return line 31 which extends radially back to a second return line 33 lying substantially along axis 25 and back to refrigerator 12. Configuring the introduction, supply and return lines in this manner advantageously allows for centrifugal forces generated by the rotating machine to assist and, in certain embodiments, supply all of the necessary force to maintain circulation of the helium between rotor assembly 14 and refrigerator 12. That is, in certain applications, fan 21 may be operated in a more limited fashion to provide supplemental force to the helium flowing through the system, while, in other applications, the fan may only be required to operate at an initial mode in which the motor is not yet rotating.

This approach takes advantage of the difference in density of the cooled heat transfer gas supplied by the refrigerator and the warmer heat transfer gas heated by the superconducting windings for return to the refrigerator. Specifically, the cold helium moving away from axis 25 along supply line 25 is denser than the warmed gas being returned along return line 31. The centrifugal force supplied by the rotating rotor assembly 14, in essence, "pushes" the helium away from axis 25 of rotor assembly 14. However, because the density of the helium being returned is lower than the helium being supplied, the lower density helium is "pushed" toward the axis, thereby setting up a recirculation loop without additional force from fan 21.

The approaches described above for cooling rotating thermal loads is particularly well suited for HTS superconducting rotating machines, such as those described in co-pending applications, Ser. No. 09/416,626, entitled "Superconducting Rotating Machines", filed Oct. 12, 1999 and Ser. No. 60/266,319, entitled "HTS Superconducting Rotating Machine", filed Jan. 11, 2000, both of which are incorporated by reference. The details of one or more embodiments of the invention are set forth in the accompanying drawings and the description below. Other features, objects, and advantages of the invention will be apparent from the description and drawings, and from the claims.

DETAILED DESCRIPTION

Figure 1:
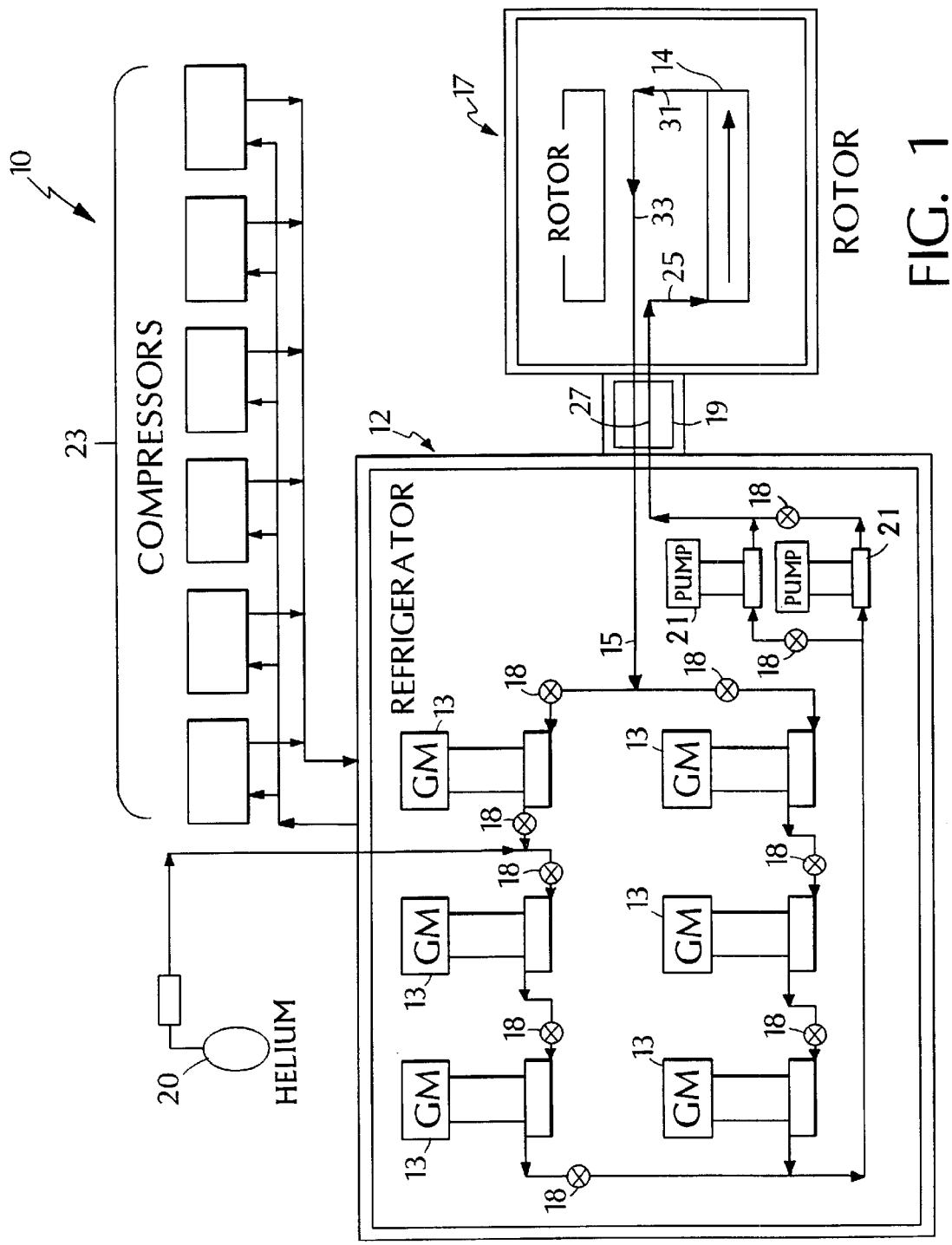
FIG. 1 is a diagrammatic representation of a cooling system in accordance with the present invention.

Referring to FIG. 1, a cooling system 10 includes a heat exchanger in the form of a refrigerator 12 connected to a load, here a rotor assembly 14 of a superconducting motor 17, via a conduit circuit 15 through which a refrigerant, cryogenic or heat transfer fluid flows. The conduit circuit is formed of vacuum insulated lines. Because the cryogenic fluid is being delivered to a rotor assembly, a rotary seal, such as ferrofluidic seal 19 is used to interface refrigerator 12, which is in a stationary reference plane to rotor assembly 14 in a rotating reference plane. In this embodiment, the cryogenic fluid is helium and, therefore, cooling system 10 includes a source 20 of helium, which may be required to replenish helium to the system due to leakage, for example through rotary seal 19. Preferentially, the cryogen circulates through the cooling system in a gaseous state. Refrigerator 12 may be in the form of any of a wide variety of configurations including perforated plate or coiled tube heat exchangers. In this embodiment, refrigerator 12 is directly attached (e.g., by solder) to six cryocoolers 13, each of which may be any of a wide variety of cryocooling refrigerators designed to operate according to one of several thermodynamic cycles including Gifford-McMahon, Stirling and pulse-tube cycle, such as those described in U.S. Pat. No. 5,482,919, which is incorporated herein by reference. Each cryocooler 13 is associated with a compressor 23, however, in other embodiments, a single compressor may be used with the multiple cryocoolers. Each cryocooler provides a cryogenically cooled surface for cooling the helium. One example of a cryocooler appropriate for use in cooling system 10 is Model No. RGS 120-T, manufactured by Leybold, Inc., Cologne, Germany.

Cryocoolers 13 are connected in a series arrangement and include valves 18 to allow each cryocooler to be isolated from remaining ones of the cryocoolers while allowing continued operation of the system. In particular, bypass conduits (not shown) for each cryocooler 13 are used to allow continued flow of the cryogenic fluid so that the isolated cryocooler can be, for example, repaired or replaced. Valves 18 may be any of a wide variety of valves capable of operating at cryogenic temperatures including control or solenoidal valves. Valcor Scientific, Inc., Springfield, N.J. provides valves (e.g., on/off type) which are appropriate for use as valve 18 in cooling system 10.

Cooling system 10 also includes, in this embodiment, a pair of high-speed (10,000–30,000 rpm) fans 21 disposed within the refrigerator 12 for circulating the helium through the cooling system. In essence, fans 21 serve as a mechanical means positioned within the cryogenic environment for providing the necessary force to move the helium past cryocoolers 13 and on to rotor assembly 14. With that in mind, other mechanical devices capable of supplying such forces and operating in a cryogenic environment including diaphragms, piston-operated devices or blowers can serve as fluid transfer device(s) in cooling system 10. Thus, unlike many conventional cooling arrangements the helium (or other cryogenic fluid) need not undergo a phase change to be re-cooled after being heated by the load. As was the case with the multiple cryocoolers 13, a pair of fans 21 is used to provide redundancy and facilitate maintenance in the event that one of the fans requires maintenance or replacement. Of course, appropriate valve and bypass conduits are required to allow each of fans 21 to be isolated from the other while allowing continuous operation of the system. A fan determined well-suited for operation in a cryogenic environment is a Model A20 fan, available from Stirling Cryogenics and Refrigeration BV, The Netherlands.

Operation of fan 21 can be limited to initial start up of rotor assembly 14 in a particular mode to increase the reliability of the fan and overall reliability of the system. In particular, rotor assembly is configured such that the helium gas is introduced through a first introduction line 27 lying substantially along an axis 25 of the rotor assembly. The cooled helium from refrigerator 12 is then provided to the superconducting field windings along a supply line 29 that extends radially away from axis 25. The helium gas is then returned along a first return line 31 which extends radially back to a second return line 33 lying substantially along axis 25 and back to refrigerator 12. Configuring the introduction, supply and return lines in this manner advantageously allows for centrifugal forces generated by the rotating machine to assist and, in certain embodiments, supply all of the necessary force to maintain circulation of the helium between rotor assembly 14 and refrigerator 12. That is, in certain applications, fan 21 may be operated in a more limited fashion to provide supplemental force to the helium flowing through the system, while, in other applications, the fan may only be required to operate at an initial mode in which the motor is not yet rotating.

This approach takes advantage of the difference in density of the cooled heat transfer gas supplied by the refrigerator and the warmer heat transfer gas heated by the superconducting windings for return to the refrigerator. Specifically, the cold helium moving away from axis 25 along supply line 25 is denser than the warmed gas being returned along return line 31. The centrifugal force supplied by the rotating rotor assembly 14, in essence, "pushes" the helium away from axis 25 of rotor assembly 14. However, because the density of the helium being returned is lower than the helium being supplied, the lower density helium is "pushed" toward the axis, thereby setting up a recirculation loop without additional force from fan 21.

Other embodiments are within the scope of the claims. For example, although helium was used as the refrigerant in the above description of cooling system 10, other working fluids, such as nitrogen, oxygen, hydrogen, argon, neon and mixtures thereof may be used depending upon the particular application, temperature of operation, and the desired level of cooling.

In other embodiments, in order to facilitate maintenance and repair of cryocoolers 13, the cryocoolers can be provided so that a sleeve-like housing is maintained in connection with the cooling system with the internal portions of the cryocoolers removable to allow repair or replacement.

The concept of the invention is equally applicable for cooling components at temperatures higher than those required for both high and low temperature superconductors. For example, cooling system 10 can also be used to cool cryogenic electronic systems at temperatures between 90° and 236° K (preferably, 150°–170° K). Examples of cryogenic electronic systems are described in U.S. Pat. No. 5,612,615, issued to Gold et al., assigned to the assignee of the present invention and incorporated herein by reference. In such cryogenic applications, refrigerants other than those described above may be preferable. For example, a fluoroalkane, or other fluorocarbon may be used, such as those described in co-pending application U.S. Ser. No. 08/698,806, filed Aug. 16, 1996, entitled "Methods and Apparatus For Cooling Systems For Cryogenic Power Conversion Electronics", and U.S. Ser. No. 09/294,474, filed Apr. 20, 1999, entitled "Methods and Apparatus for Cooling Systems for Cryogenic Power Conversion Electronics", both assigned to the assignee of the present invention and both of which are incorporated herein by reference.

In high voltage applications, the refrigerant used for providing refrigeration is desired to have a high dielectric strength characteristic. The above described fluoroalkanes, for example, are known to have such a characteristic.

What is claimed is:

1. A cryogenic cooling system for cooling a remote thermal load comprising:

a refrigerator including at least one cryogenically cooled surface and at least one cryogenic fluid transport device disposed within the refrigerator for circulating a heat transfer fluid between the cryogenically cooled surface and the remote thermal load, the heat transfer fluid maintained substantially at a single phase.

2. The cryogenic cooling system of claim 1 wherein the refrigerator is stationary and the remote thermal load rotates relative to the stationary refrigerator.

3. The cryogenic cooling system of claim 2 further comprising a cryocooler having the cryogenically cooled surface.

4. The cryogenic cooling system of claim 3 wherein the cryocooler is a Gifford-McMahon cryocooler.

5. The cryogenic cooling system of claim 1 further comprising a plurality of cryocoolers, each having a corresponding cryogenically cooled surface.

6. The cryogenic cooling system of claim 5 wherein each of the cryocoolers is a Gifford-McMahon cryocooler.

7. The cryogenic cooling system of claim 5 further comprising valving to selectively isolate at least one of the plurality of the cryocoolers from remaining ones of the plurality of cryocoolers.

8. The cryogenic cooling system of claim 1 further comprising a plurality of cryogenic fluid transport devices.

9. The cryogenic cooling system of claim 8 further comprising valving to selectively isolate at least one of the plurality of the cryogenic fluid transport devices from remaining ones of the plurality of cryogenic fluid transport devices.

10. A cryogenic cooling system for cooling a remote thermal load comprising:

a refrigerator including at least one cryogenically cooled surface and at least one cryogenic fluid transport device disposed within the refrigerator for circulating a heat transfer fluid between the cryogenically cooled surface and the remote thermal load, wherein the cryogenic fluid transfer device includes a fan.

11. The cryogenic cooling system of claim 1 wherein the heat transfer fluid is selected from a group consisting of helium, hydrogen, oxygen, nitrogen, argon, neon, and mixtures thereof.

12. The cryogenic cooling system of claim 1 wherein the heat transfer fluid is helium.

13. A method of cooling a rotating thermal load from a refrigerator including a cryogenically cooled surface, the method comprising:

positioning a fluid transport device within the refrigerator;

operating the fluid transport device to provide a heat transfer fluid to thermal load in an initial non-rotating condition; and rotating the thermal load to a sufficient rotational velocity to generate sufficient forces to cause the heat transfer fluid to move toward the rotating thermal load.

14. The method of claim 13 further comprising after rotating the thermal load, terminating operation of the fluid transport device.

15. The method of claim 13 wherein the cryogenic fluid transfer device includes a fan.

16. The method of claim 13 wherein the heat transfer fluid is selected from a group consisting of helium, hydrogen, oxygen, nitrogen, argon, neon, and mixtures thereof.

17. The method of claim 13 wherein the heat transfer fluid is helium.

18. A cryogenic cooling system for cooling a remote thermal load comprising:

a refrigerator including at least one cryogenically cooled surface and at least one cryogenic fluid transport device disposed within the refrigerator for circulating a heat transfer fluid between the cryogenically cooled surface and the remote thermal load, wherein the cryogenic fluid transport device is selected from the group consisting of a fan, a diaphragm, a piston-operated device, or a blower.

19. The cryogenic cooling system of claim 18 wherein the refrigerator is stationary and the remote thermal load rotates relative to the stationary refrigerator.

20. The cryogenic cooling system of claim 18 wherein the cryocooler is a Gifford-McMahon cryocooler.

21. The cryogenic cooling system of claim 18 wherein the heat transfer fluid is selected from a group consisting of helium, hydrogen, oxygen, nitrogen, argon, neon, and mixtures thereof.

* * * * *